(12) United States Patent
Okumura et al.

(10) Patent No.: US 12,406,812 B2
(45) Date of Patent: Sep. 2, 2025

(54) FILM CAPACITOR

(71) Applicant: Murata Manufacturing Co., Ltd., Nagaokakyo (JP)

(72) Inventors: Akira Okumura, Nagaokakyo (JP); Tomoki Inakura, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 96 days.

(21) Appl. No.: 18/397,062

(22) Filed: Dec. 27, 2023

(65) Prior Publication Data

US 2024/0170224 A1 May 23, 2024

Related U.S. Application Data

(63) Continuation of application No. PCT/JP2022/025104, filed on Jun. 23, 2022.

(30) Foreign Application Priority Data

Jul. 9, 2021 (JP) ................................ 2021-114313

(51) Int. Cl.
*H01G 4/33* (2006.01)
*H01G 4/232* (2006.01)

(52) U.S. Cl.
CPC .............. *H01G 4/33* (2013.01); *H01G 4/232* (2013.01)

(58) Field of Classification Search
CPC .................... H01G 4/33; H01G 4/232
See application file for complete search history.

(56) References Cited

U.S. PATENT DOCUMENTS

| | | | | |
|---|---|---|---|---|
| 2012/0008250 A1* | 1/2012 | Ichikawa | ................. | H01G 4/18 361/303 |
| 2014/0226256 A1* | 8/2014 | Ichikawa | ................. | H01G 4/18 525/185 |
| 2015/0235766 A1* | 8/2015 | Nishiyama | ............... | H01G 4/30 361/301.4 |

(Continued)

FOREIGN PATENT DOCUMENTS

| JP | H0457311 A | 2/1992 |
|---|---|---|
| JP | H0457312 A | 2/1992 |

(Continued)

OTHER PUBLICATIONS

International Search Report in PCT/JP2022/025104, mailed Sep. 20, 2022, 3 pages.

*Primary Examiner* — Michael P McFadden
(74) *Attorney, Agent, or Firm* — ArentFox Schiff LLP

(57) ABSTRACT

A film capacitor that includes a capacitor element having a laminate where a first metal layer is connected to a first external electrode, a second metal layer is connected to a second external electrode, a first dielectric film protrudes toward the first external electrode with respect to a second dielectric film, and a second dielectric film protrudes toward the second external electrode with respect to the first dielectric film. At an outer peripheral portion of the laminate in a thickness direction, a first protruding width of the first dielectric film increases toward an outermost periphery of the laminate in the thickness direction, and a second protruding width of the second dielectric film increases toward the outermost periphery of the laminate in the thickness direction.

14 Claims, 12 Drawing Sheets

(56) References Cited

U.S. PATENT DOCUMENTS

| | | | |
|---|---|---|---|
| 2016/0049258 A1* | 2/2016 | Kojima | H01G 4/008 29/25.42 |
| 2016/0087189 A1* | 3/2016 | Lee | H01G 4/30 29/25.35 |
| 2021/0358693 A1* | 11/2021 | Ozasa | H01G 4/005 |

FOREIGN PATENT DOCUMENTS

| | | |
|---|---|---|
| JP | 2012182352 A | 9/2012 |
| JP | 2013004916 A | 1/2013 |

* cited by examiner

Example 1

Reference Example 1

Comparative Example 1

Comparative Example 2

Example 1

Reference Example 1

Comparative Example 1

Comparative Example 2

FILM CAPACITOR

CROSS REFERENCE TO RELATED APPLICATIONS

The present application is a continuation of International application No. PCT/JP2022/025104, filed Jun. 23, 2022, which claims priority to Japanese Patent Application No. 2021-114313, filed Jul. 9, 2021, the entire contents of each of which are incorporated herein by reference.

TECHNICAL FIELD

The present invention relates to film capacitors.

BACKGROUND ART

A known type of capacitor is a film capacitor that includes a flexible film as a dielectric film, a first metal layer, and a second metal layer opposite to the first metal layer across the dielectric film. A capacitor element defining such a film capacitor is produced by, for example, winding or laminating a film provided with the first metal layer and a film provided with the second metal layer to produce a laminate and then forming external electrodes on both end surfaces of the laminate.

Such a film capacitor is used, for example, in a state where the outer periphery of the capacitor element is covered with an exterior body. For the exterior of the film capacitor, generally, the capacitor element is covered with a thermosetting resin such as an epoxy resin or with a case filled with a thermosetting resin such as an epoxy resin. Examples of materials of the case includes resins such as polyphenylene sulfide.

JP 2013-4916 A (hereinafter "Patent Literature 1") discloses a film capacitor including a wound metallized film and an electrode member connected to each end of the wound metallized film in a width direction, the wound metallized film including a stack of a first film member having a metal film on at least one surface thereof and a second film member. The first film member is arranged to protrude with respect to the second film member in the width direction and configured to have first protrusion ends and first recess ends alternating each other in a lamination direction in the wound metallized film. The metal film is exposed in portions where the first protrusion ends protrude from the first recess ends in the width direction.

SUMMARY OF THE INVENTION

The film capacitor disclosed in Patent Literature 1 is configured to have the first protrusion ends and the first recess ends alternating each other, which allows the electrode members to easily connect to the metal film. Thus, the mechanical strength of the contact portions between the metallized film and the electrode members can be improved without processing the first film member.

However, the film capacitor disclosed in Patent Literature 1 is not intended for use under repeated high and low temperature conditions. Use under repeated high and low temperature conditions causes repeated shrinkage and expansion. Such repeated shrinkage and expansion of the film capacitor causes thermal stress concentration on a portion where the films in the laminate, the external electrodes, and an exterior body are close to one another due to a difference in thermal shrinkage rate among these three. Thus, there is a room for improvement in terms of reliability against stress load.

The present invention was made to solve the above issue and aims to provide a film capacitor capable of reducing thermal stress on a portion where the thermal stress is concentrated even when the film capacitor is used under repeated high and low temperature conditions.

The film capacitor of the present invention includes a capacitor element. The capacitor element that includes: a laminate having a first end surface and a second end surface opposite to each other in a width direction; a first external electrode connected to the first end surface of the laminate; and a second external electrode connected to the second end surface of the laminate. The laminate includes: a first dielectric film having a first main surface and a second main surface opposite to each other in a thickness direction perpendicular to the width direction; a second dielectric film having a third main surface and a fourth main surface opposite to each other in the thickness direction; a first metal layer connected to the first external electrode; and a second metal layer connected to the second external electrode, wherein the second main surface of the first dielectric film is opposite to the third main surface of the second dielectric film in the thickness direction, the first dielectric film protrudes toward the first external electrode with respect to the second dielectric film, when a protruding length of the first dielectric film with respect to the second dielectric film in the width direction is defined as a first protruding width, the first protruding width is larger at an outer peripheral portion of the laminate in the thickness direction than at a central portion of the laminate in the thickness direction, and the first protruding width at the outer peripheral portion of the laminate increases toward an outermost periphery of the laminate in the thickness direction, the second dielectric film protrudes toward the second external electrode with respect to the first dielectric film, and when a protruding length of the second dielectric film with respect to the first dielectric film in the width direction is defined as a second protruding width, the second protruding width is larger at the outer peripheral portion of the laminate in the thickness direction than at the central portion of the laminate in the thickness direction, and the second protruding width at the outer peripheral portion of the laminate increases toward the outermost periphery of the laminate in the thickness direction.

The present invention provides a film capacitor capable of reducing thermal stress on a portion where the thermal stress is concentrated even when the film capacitor is used under repeated high and low temperature conditions.

DETAILED DESCRIPTION OF THE PREFERRED EMBODIMENTS

Hereinafter, a film capacitor of the present invention is described. The present invention is not limited to the following features and may be suitably modified without departing from the gist of the present invention. Combinations of two or more preferred features described in the following are also within the scope of the present invention.

Hereinafter, as an example of the film capacitor of the present invention, a wound film capacitor is described in which films including a metallized film provided with a metal layer on a main surface of a dielectric film are wound in a laminated state. The film capacitor of the present invention may be a laminated film capacitor in which films including a metallized film provided with a metal layer on a main surface of a dielectric film are laminated.

Figure 1:
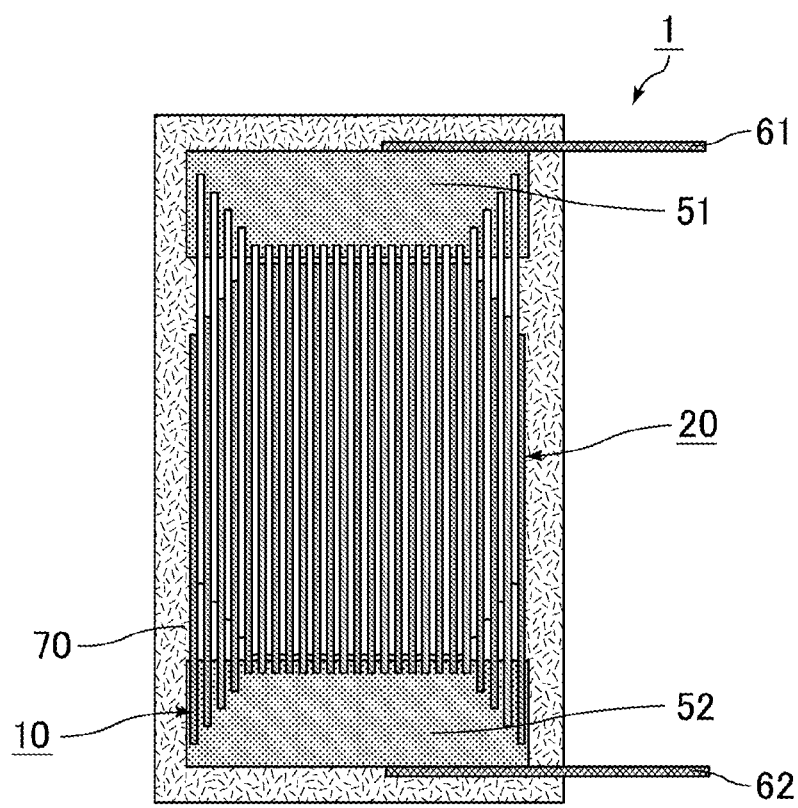
FIG. 1 is a schematic cross-sectional view showing an example of a film capacitor of the present invention.

FIG. 1 is a schematic cross-sectional view showing an example of the film capacitor of the present invention.

A film capacitor 1 shown in FIG. 1 includes a capacitor element 10. The capacitor element 10 includes a laminate 20, a first external electrode 51, and a second external electrode 52. In FIG. 1, a first lead wire 61 is electrically connected to the first external electrode 51, and a second lead wire 62 is electrically connected to the second external electrode 52.

The film capacitor 1 shown in FIG. 1 further includes an exterior resin 70 which is an example of an exterior body. The exterior resin 70 covers the outer periphery of the capacitor element 10.

Figure 2:
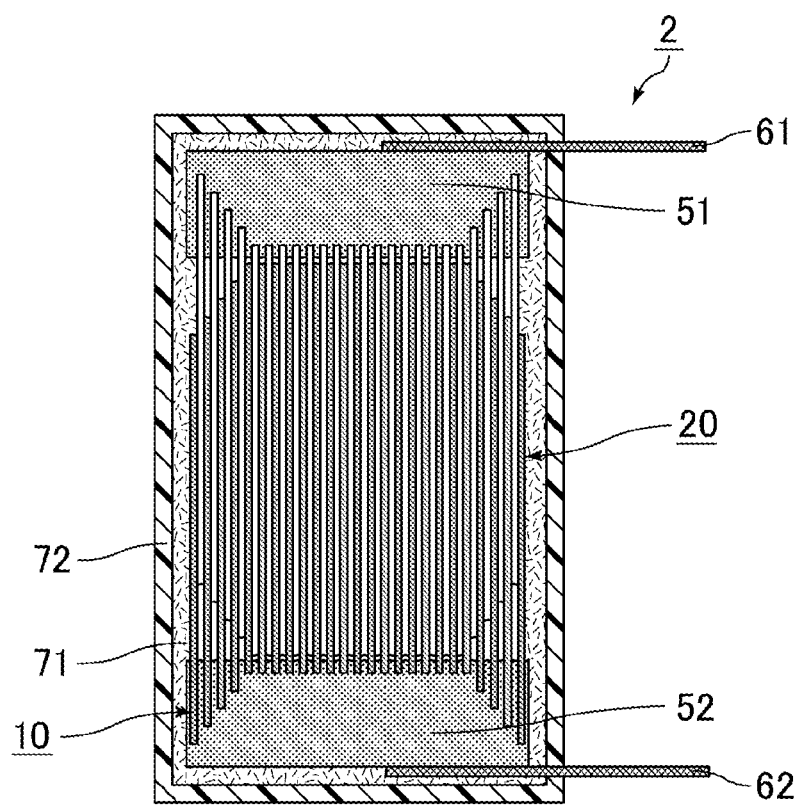
FIG. 2 is a schematic cross-sectional view showing another example of the film capacitor of the present invention.

FIG. 2 is a schematic cross-sectional view showing another example of the film capacitor of the present invention.

A film capacitor 2 shown in FIG. 2 includes the capacitor element 10. The capacitor element 10 includes the laminate 20, the first external electrode 51, and the second external electrode 52. In FIG. 2, the first lead wire 61 is electrically connected to the first external electrode 51, and the second lead wire 62 is electrically connected to the second external electrode 52.

The film capacitor 2 shown in FIG. 2 further includes a filling resin 71 and an outer case 72 as examples of the exterior body. The outer case 72 covers the outer periphery of the capacitor element 10, with the filling resin 71 filling the space between outer case 72 and the capacitor element 10.

Examples of materials of the exterior resin 70 or the filling resin 71 include thermosetting resins such as epoxy resins, silicone resins, and urethane resins. A curing agent for epoxy resins may be an amine curing agent or an imidazole curing agent. The exterior resin 70 or the filling resin 71 may contain only a resin but may also contain a reinforcing agent to improve the strength. The reinforcing agent may be silica, alumina, or the like.

Examples of materials of the outer case 72 include resins such as polyphenylene sulfides (PPS) and liquid crystal polymers (LCP).

When an LCP is used as a material of the outer case 72, for example, an LCP containing p-hydroxybenzoic acid and 6-hydroxy-2-naphthoic acid group in the skeleton can be used. Another LCP that can be used, instead of a combination of p-hydroxybenzoic acid and a 6-hydroxy-2-naphthoic acid group, is one forming a condensation polymer using various components such as phenol, phthalic acid, and ethylene terephthalate.

Preferably, the outer case 72 further contains an inorganic filler in addition to a resin. In this case, the inorganic filler contained in the outer case 72 is preferably a material having a higher melting point than the LCP, and is more preferably a material having a melting point of 680° C. or higher.

The form of the inorganic filler is not limited. For example, an inorganic filler with a longitudinal orientation, such as a fibrous inorganic filler and a plate-shaped inorganic filler, can be mentioned. Two or more of these inorganic fillers may be used in combination.

The term "fibrous" as used herein refers to a state in which the length of the filler in the longitudinal direction and the cross-sectional diameter in a cross section perpendicular to the longitudinal direction satisfy the following relationship: (longitudinal length)/(cross-sectional diameter)≥5, (i.e., the aspect ratio is 5:1 or greater). Here, the cross-sectional diameter is the distance between two points with the longest distance therebetween on the outer periphery of the cross section. When the cross-sectional diameter varies in the longitudinal direction, a portion with the largest cross-sectional diameter is used for the measurement. The term "plate-shaped" refers to a state in which the cross-sectional diameter of a surface having the largest projected area and the maximum height in a direction perpendicular to the cross section satisfy the following relationship: (cross-sectional diameter)/(height)≥3.

Preferably, the inorganic filler has a diameter of at least 5 μm and a length of at least 50 μm.

Specific examples of the inorganic filler include materials such as fibrous glass filler, plate-shaped talc, and plate-shaped mica. In particular, the inorganic filler preferably includes glass filler as a main component.

The outer case 72 containing a resin can be produced by a method such as injection molding, for example.

Preferably, an outer surface of the outer case 72 has a surface free energy of 34 mN/m to 40 mN/m. In this case, an additional member can be strongly fixed to the outer surface of the outer case 72 with an adhesive or adhesive tape with an adhesive strength of 400 N or more. The model number, characteristics, and the like can be printed on the outer surface of the outer case 72 with an ink having a high surface tension.

The surface free energy of the outer surface of the outer case 72 can be changed with the composition of the outer case 72 (resin type, filler content), the injection molding method of the outer case 72, or the like. These are merely examples. The surface free energy of the outer surface of the outer case 72 can also be controlled by other methods.

The surface free energy of the outer surface of the outer case 72 can be measured as the wetting tension, with a liquid being applied to the outer case 72.

The wetting tension of the outer surface of the outer case 72 can be measured using, for example, Tension Checkers TC-B-30 to 56 (wetting tension test pens for films) available from Pacific Chemical Co., Ltd. Specifically, a line is drawn on the outer surface of the outer case 72 using a pen with a certain value among the pens described above. If the ink line remains unchanged for two seconds without forming a droplet, the wetting tension of the outer case 72 is determined to be equal to or higher than the value of the pen. In contrast, if breakage occurs to a liquid film or shrinkage occurs as a whole at around two seconds, the same procedure for determination is repeated using a test pen with a next lower value, whereby the wetting tension of the outer case 72 is determined.

The adhesive strength of an adhesive to the outer surface of the outer case 72 can be measured by the following method, for example. A silicone-based adhesive "TSE 322" (0.1 g) available from Momentive Performance Materials Inc. is applied to the outer surface of the outer case 72. Then, the side of the outer case 72 to which the adhesive is applied is pressed onto a glass epoxy substrate "R-1705" (1.6 mm thick) available from Panasonic Electric Works Co., Ltd. After heat curing at 80° C. for two hours, the strength at which peeling occurs by pushing the outer case 72 is measured using a digital force gauge available from Imada Co., Ltd., whereby the adhesive strength of the adhesive to the outer surface of the outer case 72 can be measured.

Figure 3:
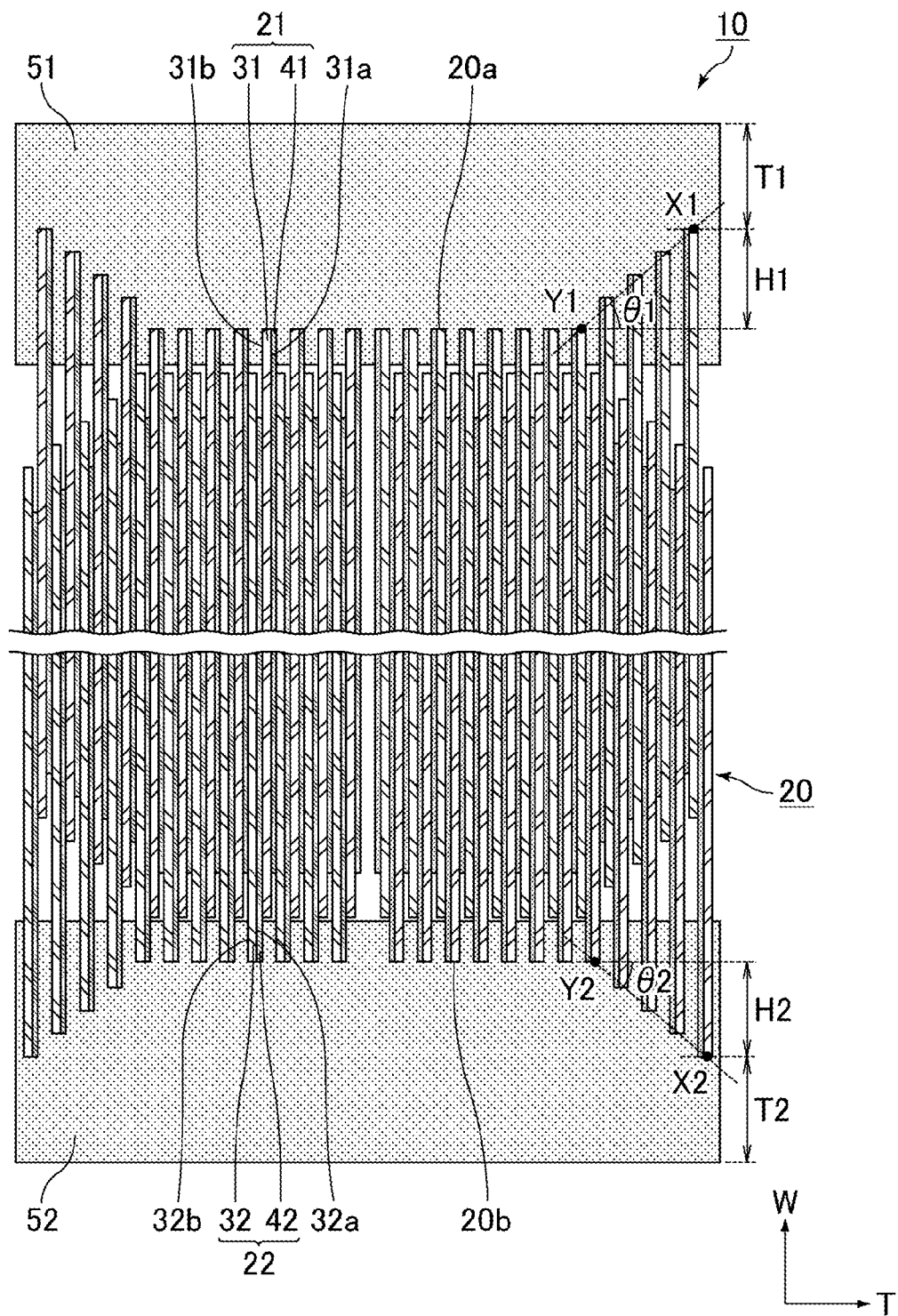
FIG. 3 is a schematic cross-sectional view showing an example of a capacitor element defining the film capacitor of the present invention.

FIG. 3 is a schematic cross-sectional view showing an example of a capacitor element defining the film capacitor of the present invention.

Herein, the thickness direction and the width direction in the capacitor element are the direction indicated by an arrow T and the direction indicated by an arrow W, respectively, as shown in FIG. 3. Here, the thickness direction T is perpendicular to the width direction W.

The capacitor element 10 shown in FIG. 3 includes the laminate 20, the first external electrode 51, and the second external electrode 52.

The laminate 20 includes a first end surface 20a and a second end surface 20b opposite to each other in the width direction W.

The laminate 20 is a wound body in which a first metallized film 21 and a second metallized film 22 are laminated in the thickness direction T and wound.

To achieve a lower profile of the capacitor element 10, the laminate 20 preferably has a flat cross-sectional shape when viewed in a cross section vertical to a spool direction of the laminate 20 (the width direction W in FIG. 3). Specifically, the laminate 20 is preferably pressed to have a flat cross section such as an oval or oblong shape so that the laminate 20 has a smaller thickness than that having a perfectly circular cross section.

Whether the laminate is pressed to have a flat cross section can be determined by, for example, checking whether a press mark is present on the laminate.

The capacitor element 10 may include a cylindrical winding shaft. The winding shaft is arranged along the central axis of the first metallized film 21 and the second metallized film 22 in a wound state and serves as a spool for winding the first metallized film 21 and the second metallized film 22.

The first metallized film 21 includes a first dielectric film 31 and a first metal layer 41.

The first dielectric film 31 includes a first main surface 31a and a second main surface 31b opposite to each other in the thickness direction T.

The first metal layer 41 is on the first main surface 31a of the first dielectric film 31. Specifically, the first metal layer 41 is on the first main surface 31a of the first dielectric film 31 such that it reaches a first lateral edge of the first dielectric film 31 but does not reach a second lateral edge of the first dielectric film 31 in the width direction W.

The second metallized film 22 includes a second dielectric film 32 and a second metal layer 42.

The second dielectric film 32 includes a third main surface 32a and a fourth main surface 32b opposite to each other in the thickness direction T.

The second metal layer 42 is on the third main surface 32a of the second dielectric film 32. Specifically, the second metal layer 42 is on the third main surface 32a of the second dielectric film 32 such that it does not reach a first lateral edge of the second dielectric film 32 but reaches a second lateral edge of the second dielectric film 32 in the width direction W.

In the laminate 20, the first metallized film 21 and the second metallized film 22 adjacent to each other in the thickness direction T are shifted from each other in the width direction W such that an end of the first metal layer 41 which reaches the lateral edge of the first dielectric film 31 is exposed at the first end surface 20a of the laminate 20 and that an end of the second metal layer 42 which reaches the lateral edge of the second dielectric film 32 is exposed at the second end surface 20b of the laminate 20. In other words, regarding the first metallized film 21 and the second metallized film 22 adjacent to each other in the thickness direction T, the first metallized film 21 protrudes toward the first external electrode 51 with respect to the second metallized film 22. Regarding the first metallized film 21 and the second metallized film 22 adjacent to each other in the thickness direction T, the second metallized film 22 protrudes toward the second external electrode 52 with respect to the first metallized film 21. In this state, the first metal layer 41 is connected to the first external electrode 51, and the second metal layer 42 is connected to the second external electrode 52. The first metal layer 41 is not connected to the second external electrode 52, and the second metal layer 42 is not connected to the first external electrode 51.

In the laminate 20, as described above, the first metallized film 21 and the second metallized film 22 adjacent to each other in the thickness direction T are shifted from each other in the width direction W. Thus, regarding the first dielectric film 31 and the second dielectric film 32 adjacent to each other in the thickness direction T, the first dielectric film 31 protrudes toward the first external electrode 51 with respect to the second dielectric film 32. Regarding the first dielectric film 31 and the second dielectric film 32 adjacent to each other in the thickness direction T, the second dielectric film 32 protrudes toward the second external electrode 52 with respect to the first dielectric film 31.

The laminate 20 in which the first metallized film 21 and the second metallized film 22 are laminated in the thickness direction T and wound can be regarded as including the first dielectric film 31, the first metal layer 41, the second dielectric film 32, and the second metal layer 42 sequentially in the thickness direction T. The laminate 20 can also be regarded as a wound body in which the first dielectric film 31, the first metal layer 41, the second dielectric film 32, and the second metal layer 42 are sequentially laminated in the thickness direction T and wound.

In the laminate 20, the second main surface 31b of the first dielectric film 31 is opposite to the third main surface 32a of the second dielectric film 32 in the thickness direction T. The first main surface 31a of the first dielectric film 31 is opposite to the fourth main surface 32b of the second dielectric film 32 in the thickness direction T. As described above, in the laminate 20, the first metallized film 21 and the second metallized film 22 are laminated in the thickness direction T and wound. In other words, the laminate 20 is wound such that the first metallized film 21 is inside the second metallized film 22. Specifically, the first metallized film 21 and the second metallized film 22 are laminated in the thickness direction T and wound such that the first metal layer 41 is inside the first dielectric film 31 and that the second metal layer 42 is inside the second dielectric film 32. In other words, in the laminate 20, the first metal layer 41 and the second metal layer 42 are opposite to each other across the first dielectric film 31 or the second dielectric film 32.

When the protruding length of the first dielectric film 31 with respect to the second dielectric film 32 in the width direction W is defined as a first protruding width, as shown in FIG. 3, the first protruding width is larger at the outer peripheral portion of the laminate 20 in the thickness direction T than at the central portion of the laminate 20 in the thickness direction T, and the first protruding width at the outer peripheral portion of the laminate 20 increases toward the outermost periphery of the laminate 20 in the thickness direction T.

When the protruding length of the second dielectric film 32 with respect to the first dielectric film 31 in the width direction W is defined as a second protruding width, as shown in FIG. 3, the second protruding width is larger at the outer peripheral portion of the laminate 20 in the thickness direction T than at the central portion of the laminate 20 in the thickness direction T, and the second protruding width at the outer peripheral portion of the laminate 20 increases toward the outermost periphery of the laminate 20 in the thickness direction T.

As described above, when the film capacitor is used under repeated high and low temperature conditions, the thermal stress is concentrated on a portion where the films in the laminate, the external electrodes, and the exterior body are close to one another due to a difference in thermal shrinkage rate among these three. The film capacitor of the present invention is formed such that the protruding width of the films is larger at the outer peripheral portion of the laminate than at the central portion of the laminate and also that the protruding width of the films at the outer peripheral portion of the laminate increases toward the outermost periphery of the laminate, whereby the form of bonding between the film and the external electrodes is improved. This can reduce thermal stress on a portion where the thermal stress is concentrated.

The first protruding width is preferably constant at the central portion of the laminate 20 in the thickness direction T as shown in FIG. 3, but the height may vary with a difference of not more than 50 µm. Similarly, the second protruding width is preferably constant at the central portion of the laminate 20 in the thickness direction T as shown in FIG. 3, but the height may vary with a difference of not more than 50 µm.

When viewed in a cross section in the thickness direction T and the width direction W, preferably, the angle (the angle indicated by θ1 in FIG. 3, which is also referred to as the first pitch angle θ1) between a straight line passing through a point X1 and a point Y1 and a straight line passing through ends of layers of the first dielectric film 31 at which the first protruding width is the smallest is 50° to 80°, where the point X1 is an end of one of the layers of the first dielectric film 31, which is the closest to the outermost periphery of the laminate 20 in the thickness direction T and at which the first protruding width is the largest, and the point Y1 is an end of one of the layers of the first dielectric film 31, which is the closest to the point X1 and at which the first protruding width is the smallest. In this case, the effect of reducing the thermal stress on the point X1 is high.

When viewed in a cross section in the thickness direction T and the width direction W, the length (the length indicated by H1 in FIG. 3, which is also referred to as the first pitch height H1) between the point X1 and the point Y1 in the width direction W is preferably 5% to 50% of the length (the length indicated by T1 in FIG. 3, which is also referred to as the first electrode thickness T1) between an outer end of the first external electrode 51 and the point X1 in the width direction W, where the point X1 is an end of one of the layers of the first dielectric film 31, which is the closest to the outermost periphery of the laminate 20 in the thickness direction T and at which the first protruding width is the largest, and the point Y1 is an end of one of the layers of the first dielectric film 31, which is the closest to the point X1 and at which the first protruding width is the smallest. In this case, the effect of reducing the thermal stress on the point X1 is high.

The second main surface 31b of the first dielectric film 31, which is the closest to the outermost periphery of the laminate 20 in the thickness direction T and at which the first protruding width is the largest, may be covered with the first external electrode 51 as shown in FIG. 3 or may not be covered with the first external electrode 51. In other words, when the outer periphery of the capacitor element 10 is covered with an exterior body, an end of the first dielectric film 31, which is the closest to the outermost periphery of the laminate 20 in the thickness direction T and at which the first protruding width is the largest, may or may not be in contact with the exterior body.

When viewed in a cross section in the thickness direction T and the width direction W, preferably, the angle (the angle indicated by θ2 in FIG. 3, which is also referred to as the second pitch angle θ2) between a straight line passing through the point X2 and the point Y2 and a straight line passing through ends of layers of the second dielectric film 32 at which the second protruding width is the smallest is 50° to 80°, where the point X2 is an end of one of the layers of the second dielectric film 32, which is the closest to the outermost periphery of the laminate 20 in the thickness direction T and at which the second protruding width is the largest, and the point Y2 is an end of one of the layers of the second dielectric film 32, which is the closest to the point X2 and at which the second protruding width is the smallest. In this case, the effect of reducing the thermal stress on the point X2 is high.

When viewed in a cross section in the thickness direction T and the width direction W, the length (the length indicated by H2 in FIG. 3, which is also referred to as the second pitch height H2) between the point X2 and the point Y2 in the width direction W is preferably 5% to 50% of the length (the length indicated by T2 in FIG. 3, which is also referred to as the second electrode thickness T2) between an outer end of the second external electrode 52 and the point X2 in the width direction W, where the point X2 is an end of one of the layers of the second dielectric film 32, which is the closest to the outermost periphery of the laminate 20 in the thickness direction T and at which the second protruding width is the largest, and the point Y2 is an end of one of the layers of the second dielectric film 32, which is the closest to the point X2 and at which the second protruding width is the smallest. In this case, the effect of reducing the thermal stress on the point X2 is high.

The fourth main surface 32b of the second dielectric film 32, which is the closest to the outermost periphery of the laminate 20 in the thickness direction T and at which the second protruding width is the largest, may be covered with the second external electrode 52 as shown in FIG. 3 or may not be covered with the second external electrode 52. In other words, when the outer periphery of the capacitor element 10 is covered with an exterior body, an end of the second dielectric film 32, which is the closest to the outermost periphery of the laminate 20 in the thickness direction T and at which the second protruding width is the largest, may or may not be in contact with the exterior body.

The ends of the first dielectric film 31 and the second dielectric film 32 and the outer ends of the first external electrode 51 and the second external electrode 52 are each preferably flat, but the height may vary with a difference of not more than 50 μm.

The first pitch height H1, the second pitch height H2, the first electrode thickness T1, the second electrode thickness T2, and the like can be determined by, for example, observation of a cross section shown in FIG. 3 obtained by a rotary polishing machine or the like under a microscope equipped with a length measurement function.

The first dielectric film 31 may contain a curable resin as a main component.

The term "main component" as used herein refers to a component with the highest weight percentage, and preferably refers to a component whose weight percentage is more than 50 wt %.

The curable resin may be a thermosetting resin or a photocurable resin.

The term "thermosetting resin" as used herein refers to a heat curable resin, but the curing method is not limited. Thus, the thermosetting resin encompasses a resin cured by a method other than using heat (such as light or electron beam) as long as the resin is heat curable. Some materials may start a reaction due to their own reactivity. The thermosetting resin also includes such materials that do not necessarily require external heat or the like to start curing. Similarly, the photocurable resin encompasses a resin cured by a method other than using light (such as heat) as long as the resin is photocurable.

The curable resin preferably includes a cured product of a first organic material containing a hydroxy group (OH group) and a second organic material containing an isocyanate group (NCO group). In this case, the curable resin includes a cured product having a urethane bond resulting from reaction between the hydroxy group of the first organic material and the isocyanate group of the second organic material.

The presence of the urethane bond in the first dielectric film 31 can be determined by analysis using a Fourier transform infrared spectrophotometer (FT-IR).

When the curable resin is obtained by the above reaction, the first dielectric film 31 may contain uncured residues of the starting materials. For example, the first dielectric film 31 may contain at least one of a hydroxy group or an isocyanate group. In this case, the first dielectric film 31 may contain either one or both of a hydroxy group and an isocyanate group.

The presence of the hydroxy group and/or the isocyanate group in the first dielectric film 31 can be determined by analysis using a FT-IR.

Examples of the first organic material include phenoxy resins, polyvinyl acetoacetal resin, and polyvinyl butyral resin.

The first organic material may be any combination of two or more organic materials.

Examples of the second organic material include aromatic polyisocyanates such as diphenylmethane diisocyanate (MDI) and tolylene diisocyanate (TDI) and aliphatic polyisocyanates such as hexamethylene diisocyanate (HDI). The second organic material may be a modified product of at least one of these polyisocyanates, or a mixture of at least one of these polyisocyanates and a modified product thereof.

The second organic material may be any combination of two or more organic materials.

The first dielectric film 31 may contain a thermoplastic resin as a main component.

Examples of the thermoplastic resin include polypropylene, polyethersulfone, polyetherimide, and polyarylate.

The first dielectric film 31 may contain additives for providing various functions.

Examples of the additives include leveling agents for providing smoothness.

A preferred additive is one having a functional group that reacts with a hydroxy group and/or an isocyanate group and capable of forming a part of the crosslinked structure of the cured product. Examples of such an additive include a resin having at least one functional group selected from the group consisting of a hydroxy group, an epoxy group, a silanol group, and a carboxy group.

As with the first dielectric film 31, the second dielectric film 32 may contain a curable resin as a main component or may contain a thermoplastic resin as a main component. As with the first dielectric film 31, the second dielectric film 32 may contain additives.

The first dielectric film 31 and the second dielectric film 32 may have different compositions, but preferably have the same composition.

The first dielectric film 31 and the second dielectric film 32 each have a thickness of preferably 1 μm to 10 μm, more preferably 3 μm to 5 μm.

The first dielectric film 31 and the second dielectric film 32 may have different thicknesses, but preferably have the same thickness.

The thicknesses of the first dielectric film 31 and the second dielectric film 32 can be measured with an optical film thickness gauge.

Preferably, the first dielectric film 31 and the second dielectric film 32 are each produced by forming a film from a resin solution containing resin materials as described above and curing the film by heat treatment.

Examples of constituent materials of the first metal layer 41 and the second metal layer 42 include metals such as aluminum, zinc, titanium, magnesium, tin, and nickel.

The first metal layer 41 and the second metal layer 42 may have different compositions, but preferably have the same composition.

Preferably, the first metal layer 41 and the second metal layer 42 each have a thickness of 5 nm to 40 nm.

The first metal layer 41 and the second metal layer 42 may have different thicknesses, but preferably have the same thickness.

The thickness of the first metal layer 41 can be determined by observing a cross section of the first metallized film 21 in the thickness direction using a transmission electron microscope (TEM). The thickness of the second metal layer 42 can be measured as in the thickness of the first metal layer 41.

Preferably, the first metal layer 41 and the second metal layer 42 are formed by vapor deposition of the metal mentioned above or the like on the main surface of the first dielectric film 31 and the main surface of the second dielectric film 32, respectively.

The first metal layer 41 may include a fuse portion. The fuse portion of the first metal layer 41 is where a split electrode portion at which a portion of the first metal layer 41 opposite to the second metal layer 42 is split into portions is connected to an electrode portion of the first metal layer 41 not opposite to the second metal layer 42. Examples of electrode patterns of the first metal layer 41 with fuse portions include those disclosed in JP 2004-363431 A and JP H5-251266 A.

The second metal layer 42 may also include a fuse portion as with the first metal layer 41.

The first external electrode 51 is connected to the first end surface 20a of the laminate 20. Specifically, the first external electrode 51 is in contact with an end of the first metal layer 41 exposed at the first end surface 20a of the laminate 20 and is thus connected to the first metal layer 41. The first external electrode 51 is not connected to the second metal layer 42.

The second external electrode 52 is connected to the second end surface 20b of the laminate 20. Specifically, the second external electrode 52 is in contact with an end of the second metal layer 42 exposed at the second end surface 20b of the laminate 20 and is thus connected to the second metal layer 42. The second external electrode 52 is not connected to the first metal layer 41.

Examples of constituent materials of the first external electrode 51 and the second external electrode 52 include metals such as zinc, aluminum, tin, and zinc-aluminum alloys.

The first external electrode 51 and the second external electrode 52 may have different compositions, but preferably have the same composition.

Preferably, the first external electrode 51 and the second external electrode 52 are formed by thermally spraying the metal mentioned above or the like on the first end surface 20a and the second end surface 20b of the laminate 20, respectively.

The capacitor element 10 is produced by the following method, for example.

<Step of Producing Metallized Film>

Figure 4:
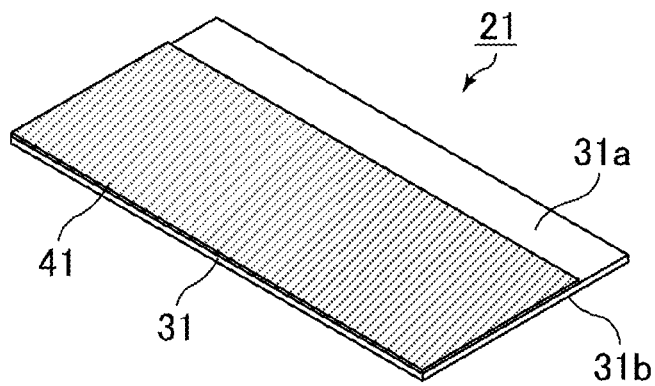
FIG. 4 is a schematic perspective view showing a step of producing a first metallized film in an example of a method of producing the film capacitor of the present invention.
Figure 5:
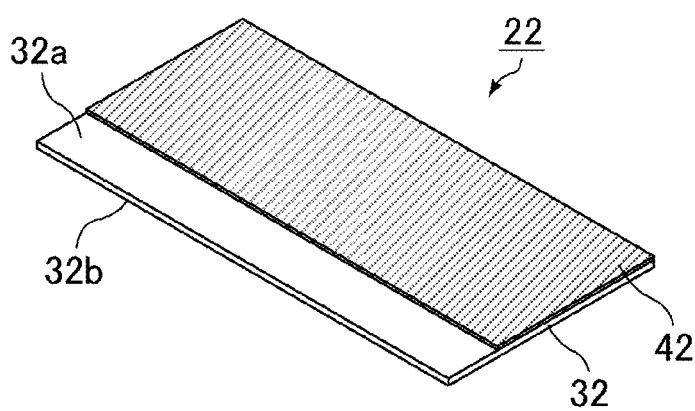
FIG. 5 is a schematic perspective view showing a step of producing a second metallized film in an example of the method of producing the film capacitor of the present invention.

FIG. 4 is a schematic perspective view showing a step of producing the first metallized film in an example of a method of producing the film capacitor of the present invention. FIG. 5 is a schematic perspective view showing a step of producing the second metallized film in an example of the method of producing the film capacitor of the present invention.

First, for example, the first organic material, the second organic material, additives, and the like described above are mixed to prepare a resin solution. The resin solution is formed into a film and cured by heat treatment to produce the first dielectric film 31 and the second dielectric film 32 as shown in FIG. 4 and FIG. 5.

Next, as shown in FIG. 4, the first metal layer 41 is formed on the first main surface 31a of the first dielectric film 31 by vapor deposition of, for example, a metal such as aluminum, zinc, titanium, magnesium, tin, or nickel, whereby the first metallized film 21 is produced. At this time, the first metal layer 41 is formed such that it reaches the first lateral edge of the first dielectric film 31 but does not reach the second lateral edge of the first dielectric film 31 in the width direction.

As shown in FIG. 5, the second metal layer 42 is formed on the third main surface 32a of the second dielectric film 32 by vapor deposition of, for example, a metal such as aluminum, zinc, titanium, magnesium, tin, or nickel, whereby the second metallized film 22 is produced. At this time, the second metal layer 42 is formed such that it does not reach the first lateral edge of the second dielectric film 32 but reaches the second lateral edge of the second dielectric film 32 in the width direction.

<Step of Producing Laminate>

Figure 6:
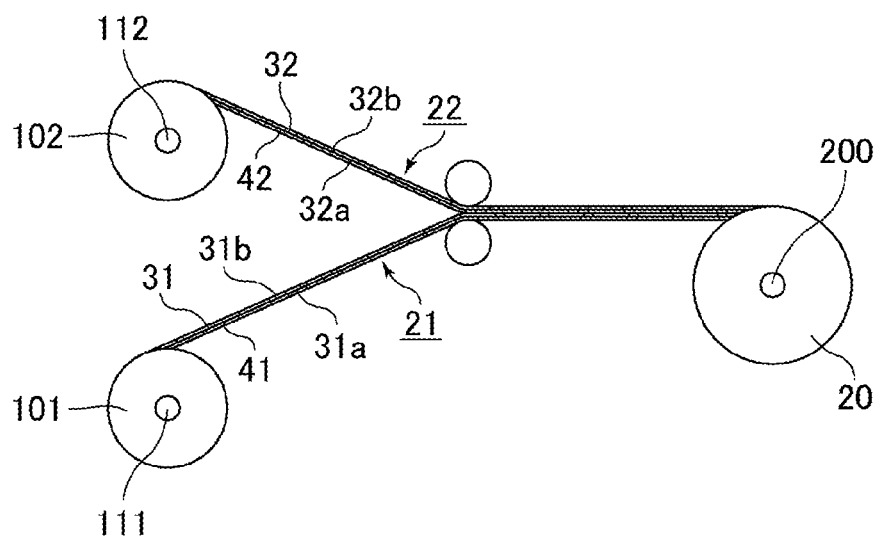
FIG. 6 is a schematic cross-sectional view showing a step of producing a laminate in an example of the method of producing the film capacitor of the present invention.

FIG. 6 is a schematic cross-sectional view showing a step of producing the laminate in an example of the method of producing the film capacitor of the present invention.

First, as shown in FIG. 6, a first film reel 101 is prepared by winding the first metallized film 21 around a first reel shaft 111, and a second film reel 102 is obtained by winding the second metallized film 22 around a second reel shaft 112.

Next, the first metallized film 21 is unwound from the first film reel 101, and the second metallized film 22 is unwound from the second film reel 102. At this time, the first metallized film 21 and the second metallized film 22 are unwound such that the second main surface 31b of the first dielectric film 31 is opposite to the third main surface 32a of the second dielectric film 32.

The first metallized film 21 and the second metallized film 22 unwound are then shifted from each other in the width direction and wound around a winding shaft 200.

Figure 7:
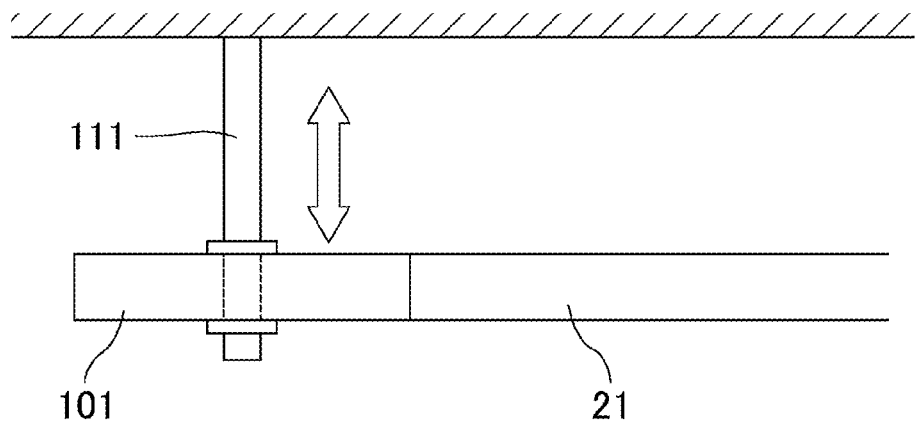
FIG. 7 is a schematic top view showing unwinding of a first metallized film from a first film reel in FIG. 6.

FIG. 7 is a schematic top view showing unwinding of the first metallized film from the first film reel in FIG. 6.

As shown in FIG. 7, in unwinding the first metallized film 21, the first reel shaft 111 can be oscillated back and forth in the width direction (the direction indicated by the double arrow) perpendicular to the unwinding direction. The oscillation of the first reel shaft 111 in the width direction allows the first metallized film 21 to be unwound while moving back and forth in the same width direction.

Similarly, in unwinding the second metallized film 22, the second reel shaft 112 can be oscillated back and forth in the width direction perpendicular to the unwinding direction. This allows the second metallized film 22 to be unwound while moving back and forth in the same width direction.

Adjusting the oscillation conditions such as oscillation timing and oscillation distance in oscillating the first reel shaft 111 and the second reel shaft 112 can adjust the first protruding width and the second protruding width described above. As a result, the laminate 20 having a structure as shown in FIG. 3 can be produced in a wound state around the winding shaft 200.

Adjusting the winding rate of the winding shaft 200 in combination with the oscillation conditions of the first reel shaft 111 and the second reel shaft 112 can also adjust the first protruding width and the second protruding width.

The laminate 20 as shown in FIG. 3 can be produced in a wound state around the winding shaft 200 also by oscillating the winding shaft 200 in the width direction or oscillating running rolls which run the first metallized film 21 and the second metallized film 22 in the width direction instead of oscillating the first reel shaft 111 and the second reel shaft 112 in the width direction.

Subsequently, if necessary, the resulting laminate 20 may be sandwiched in the direction perpendicular to the width direction and pressed into an oval cylindrical shape.

<Step of Forming External Electrodes>

For example, a metal such as zinc, aluminum, tin, a zinc-aluminum alloy is thermally sprayed on the first end surface 20*a* of the laminate 20, whereby the first external electrode 51 shown in FIG. 3 is formed to be connected to the first metal layer 41.

For example, a metal such as zinc, aluminum, tin, a zinc-aluminum alloy is thermally sprayed on the second end surface 20*b* of the laminate 20, whereby the second external electrode 52 shown in FIG. 3 is formed to be connected to the second metal layer 42.

Thus, the capacitor element 10 shown in FIG. 3 is produced.

Subsequently, if necessary, conductor terminals such as lead wires may be connected to each of the first external electrode 51 and the second external electrode 52, and then the outer periphery of the capacitor element 10 may be covered with an exterior body.

models that simulate the respective film capacitors were used as the analysis targets for stress analysis by the finite element method (FEM).

Figure 12:
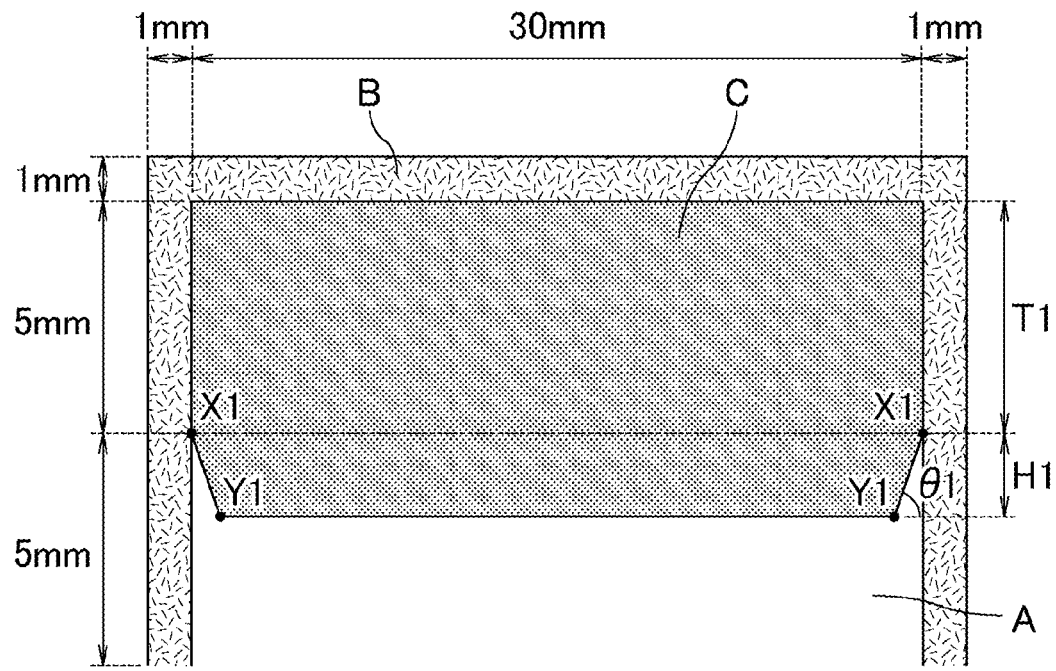
FIG. 12 is a schematic cross-sectional view showing an example of a film capacitor model for analysis that simulates the film capacitor according to Example 1.
Figure 13:
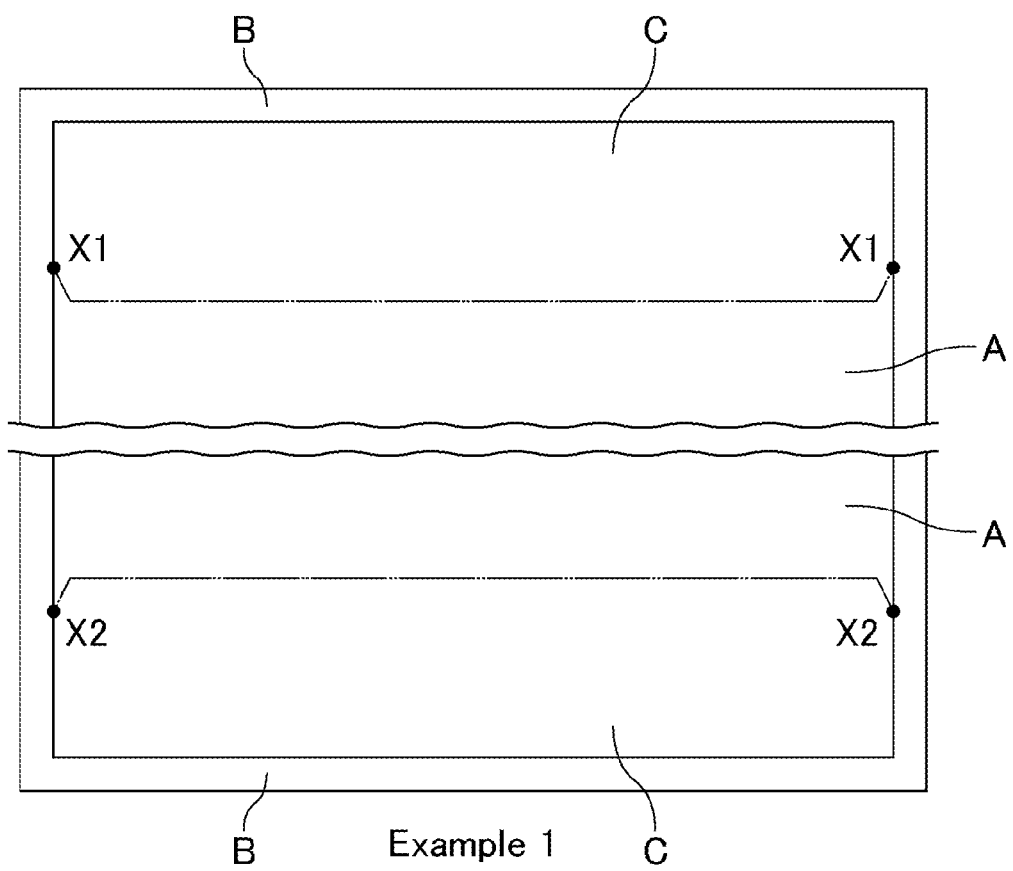
FIG. 13 is a schematic cross-sectional view showing the film capacitor model of Example 1.

FIG. 12 is a schematic cross-sectional view showing an example of a film capacitor model for analysis that simulates the film capacitor according to Example 1. FIG. 13 is a schematic cross-sectional view showing the film capacitor model of Example 1.

As shown in FIG. 12, a film portion A and an external electrode portion C each had a width of 30 mm and a thickness of 5 mm. The entire body was covered with a 1-mm thick exterior portion B. A portion at which the film portion A, the exterior portion B, and the external electrode portion C were in contact with one another was defined as a point X1. A point closest to the point X1 and located at a lowest point of the film portion A was defined as a point Y1.

In FIG. 12, the first pitch angle θ1 was 71°, and the first pitch height H1 was 1.5 mm (the ratio of the first pitch height H1 to the first electrode thickness T1 was 30%).

Figure 14:
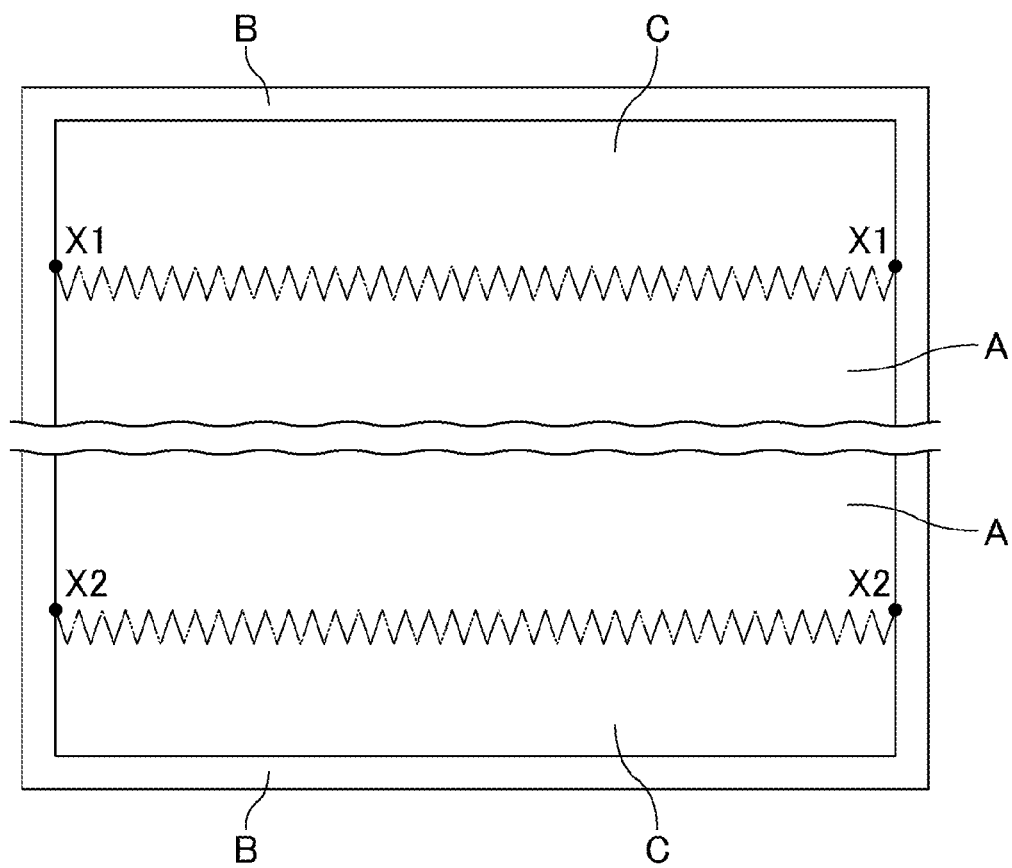
FIG. 14 is a schematic cross-sectional view showing a film capacitor model of Reference Example 1.
Figure 15:
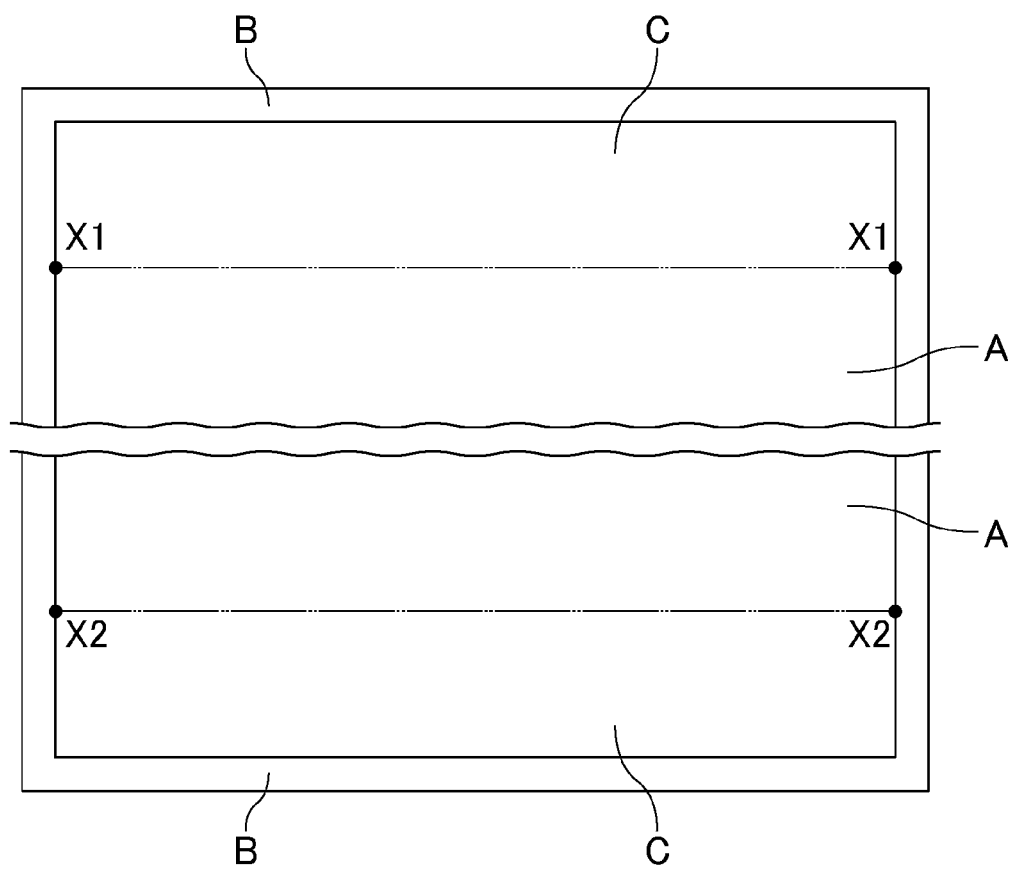
FIG. 15 is a schematic cross-sectional view showing a film capacitor model of Comparative Example 1.
Figure 16:
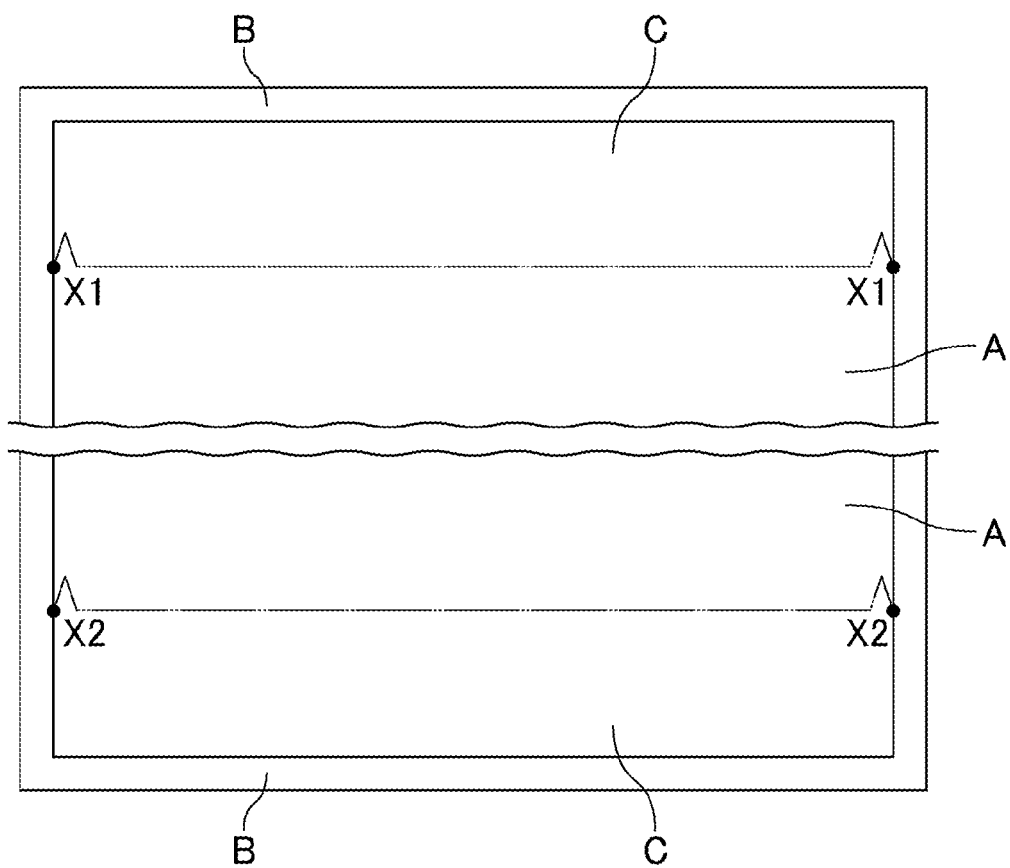
FIG. 16 is a schematic cross-sectional view showing a film capacitor model of Comparative Example 2.

FIG. 14 is a schematic cross-sectional view showing a film capacitor model of Reference Example 1. FIG. 15 is a schematic cross-sectional view showing a film capacitor model of Comparative Example 1. FIG. 16 is a schematic cross-sectional view showing a film capacitor model of Comparative Example 2.

In the film capacitor models of Example 1, Reference Example 1, Comparative Example 1, and Comparative Example 2, the film portion A was made of a thermosetting resin film (linear expansion coefficient: $60 \times 10^{-6}$/° C.), the exterior portion B was made of an epoxy resin (linear expansion coefficient: $27 \times 10^{-6}$/° C.), and the external electrode portion C was made of an Al—Zn electrode (linear expansion coefficient: $30.2 \times 10^{-6}$/° C.). Table 1 shows characteristics of the thermosetting resin film, the epoxy resin, and the Al—Zn electrode.

TABLE 1

|  | Young's modulus [Pa] | Poisson's ratio | Density [kg/m³] | Linear expansion coefficient [1/° C.] | Specific heat [J/kg/° C.] | Thermal conductivity [W/m/° C.] |
| --- | --- | --- | --- | --- | --- | --- |
| Thermosetting resin film | $1.8 \times 10^9$ | 0.4 | 1195 | $60 \times 10^{-6}$ | 980 | 0.2 |
| Epoxy resin | $7.9 \times 10^9$ | 0.3 | 1808 | $27 \times 10^{-6}$ | 900 | 0.6 |
| Al—Zn electrode | $103 \times 10^9$ | 0.25 | 7130 | $30.2 \times 10^{-6}$ | 390 | 120 |

Thus, the film capacitor 1 shown in FIG. 1 or the film capacitor 2 shown in FIG. 2 is produced.

EXAMPLES

Examples that more specifically disclose the film capacitor of the present invention are described below. The present invention is not limited to these examples.

Figure 8:
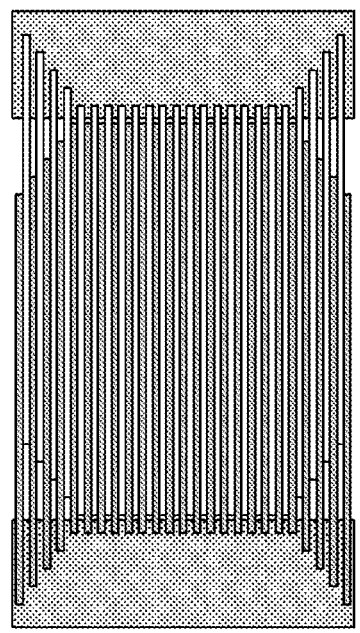
FIG. 8 is a schematic cross-sectional view showing a capacitor element defining a film capacitor according to Example 1.
Figure 9:
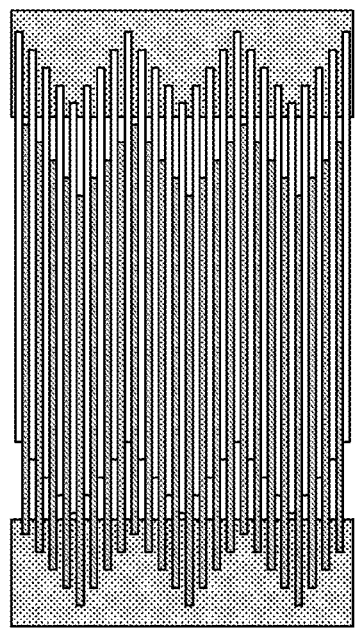
FIG. 9 is a schematic cross-sectional view showing a capacitor element defining a film capacitor according to Reference Example 1.
Figure 10:
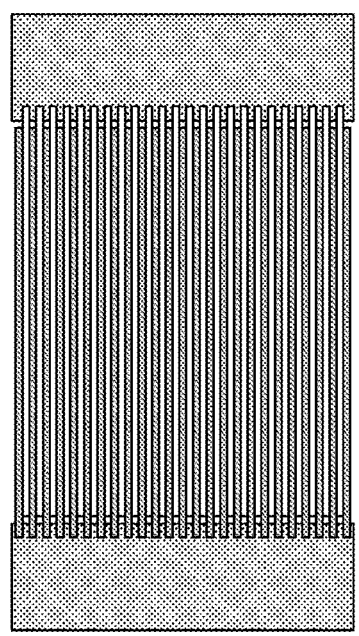
FIG. 10 is a schematic cross-sectional view showing a capacitor element defining a film capacitor according to Comparative Example 1.
Figure 11:
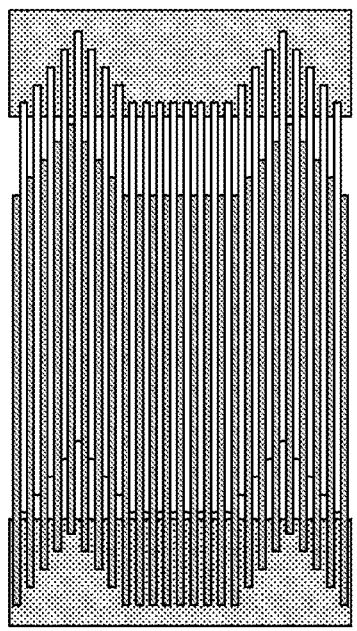
FIG. 11 is a schematic cross-sectional view showing a capacitor element defining a film capacitor according to Comparative Example 2.

FIG. 8 is a schematic cross-sectional view showing a capacitor element defining a film capacitor according to Example 1. FIG. 9 is a schematic cross-sectional view showing a capacitor element defining a film capacitor according to Reference Example 1. FIG. 10 is a schematic cross-sectional view showing a capacitor element defining a film capacitor according to Comparative Example 1. FIG. 11 is a schematic cross-sectional view showing a capacitor element defining a film capacitor according to Comparative Example 2.

In Example 1, Reference Example 1, Comparative Example 1, and Comparative Example 2, film capacitor In each of the film capacitor models of Example 1, Reference Example 1, Comparative Example 1, and Comparative Example 2, the maximum thermal stress applied to the point X1 when the atmospheric temperature was increase from 25° C. to 125° C. was determined. Further, the maximum thermal stress applied to the point X2 opposite to the point X1 was determined. Table 2 shows the results.

TABLE 2

|  | Point X1 | Point X2 |
| --- | --- | --- |
| Example 1 | 6 MPa | 6 MPa |
| Reference Example 1 | 14 MPa | 20 MPa |
| Comparative Example 1 | 47 MPa | 47 MPa |
| Comparative Example 2 | 20 MPa | 14 MPa |

According to Table 2, the thermal stress on the point X1 and the point X2 is reduced in Example 1, compared to Reference Example 1, Comparative Example 1, and Comparative Example 2.

In the film capacitor model of Example 1, the first pitch angle θ1 and the first pitch height H1 were changed to the values shown in Table 3, and the maximum thermal stress applied to the point X1 and the point X2 was determined in the same manner described above. Using Reference Example 1 shown in Table 2 as the reference, the film capacitor model was evaluated as "Good" when the maximum thermal stress applied to the point X1 and the point X2 was less than 20 MPa and as "Average" when the maximum thermal stress applied was 20 MPa to less than 25 MPa. Table 3 shows the results.

TABLE 3

| | | H1 (mm) | | | |
|---|---|---|---|---|---|
| | | 0.25 | 0.5 | 1.5 | 2.5 |
| H1/T1 (%) | | 5 | 10 | 30 | 50 |
| θ1 (°) | 30 | Average | Average | Average | Average |
| | 40 | Average | Average | Good | Good |
| | 50 | Good | Good | Good | Good |
| | 60 | Good | Good | Good | Good |
| | 71 | Good | Good | Good | Good |
| | 80 | Good | Good | Good | Good |

Table 3 shows that the thermal stress on the point X1 and the point X2 was reduced in the predetermined ranges of the first pitch angle θ1 and the ratio of the first pitch height H1 to the first electrode thickness T1, as compared to Reference Example 1 in Table 2.

A film capacitor model having the same shape as shown in Table 3 was configured by replacing the thermosetting resin film in the film capacitor model of Example 1 with a thermoplastic resin film, i.e., a polypropylene film (linear expansion coefficient: $100 \times 10^{-6}$/° C.). Table 4 shows characteristics of the polypropylene film.

TABLE 4

| | Young's modulus [Pa] | Poisson's ratio | Density [kg/m$^3$] | Linear expansion coefficient [1/° C.] | Specific heat [J/kg/° C.] | Thermal conductivity [W/m/° C.] |
|---|---|---|---|---|---|---|
| Polypropylene film | $1.53 \times 10^9$ | 0.4 | 910 | $100 \times 10^{-6}$ | 2030 | 0.3 |

The maximum thermal stress applied to the point X1 and the point X2 was determined in the same manner described above. Table 5 shows the results.

TABLE 5

| | | H1 (mm) | | | |
|---|---|---|---|---|---|
| | | 0.25 | 0.5 | 1.5 | 2.5 |
| H1/T1 (%) | | 5 | 10 | 30 | 50 |
| θ1 (*) | 30 | Good | Good | Good | Good |
| | 40 | Good | Good | Good | Good |
| | 50 | Good | Good | Good | Good |
| | 60 | Good | Good | Good | Good |
| | 71 | Good | Good | Good | Good |
| | 80 | Good | Good | Good | Good |

Table 5 shows that the thermal stress on the point X1 and the point X2 was reduced in all the ranges of the first pitch angle θ1 and the ratio of the first pitch height H1 to the first electrode thickness T1 shown in Table 5, as compared to Reference Example 1 in Table 2.

Figure 17:
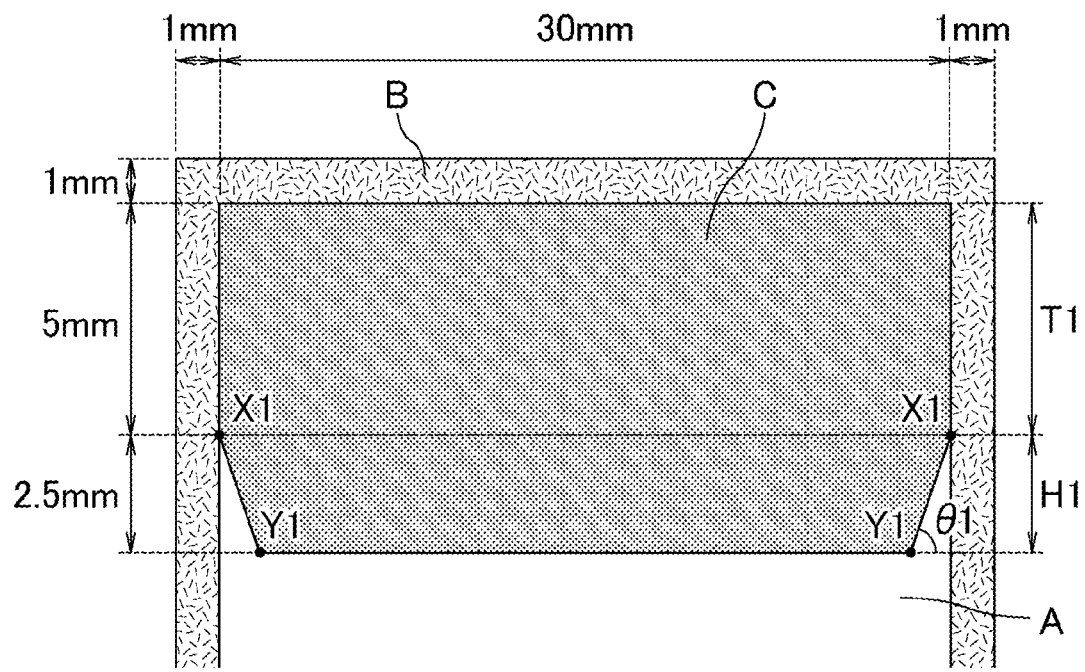
FIG. 17 is a schematic cross-sectional view showing a first modified example of the film capacitor model for analysis that simulates the film capacitor according to Example 1.

FIG. 17 is a schematic cross-sectional view showing a first modified example of the film capacitor model for analysis that simulates the film capacitor according to Example 1.

In FIG. 17, the external electrode portion C had a thickness of 5 mm, the first pitch angle θ1 was 71°, and the first pitch height H1 was 2.5 mm (the ratio of the first pitch height H1 to the first electrode thickness T1 was 50%). In this case, the thermal stress on the point X1 was 5.7 MPa. The thermal stress on the point X2 opposite to the point X1 was also 5.7 MPa.

Figure 18:
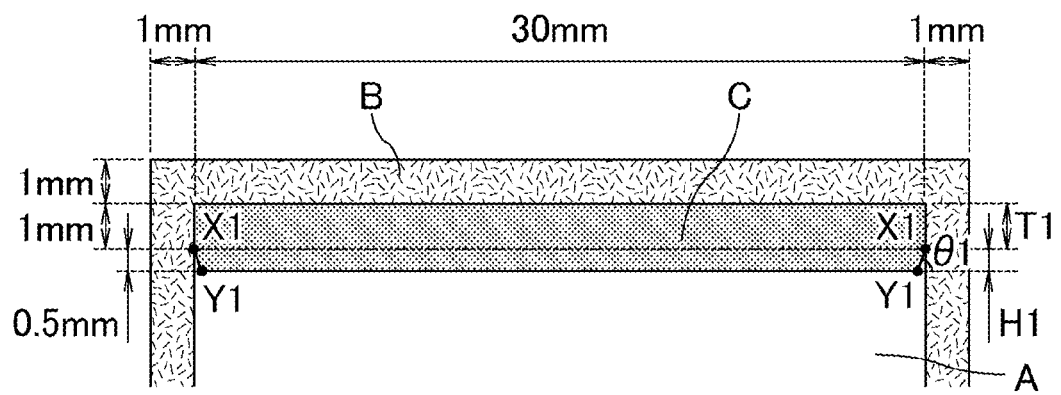
FIG. 18 is a schematic cross-sectional view showing a second modified example of the film capacitor model for analysis that simulates the film capacitor according to Example 1.

FIG. 18 is a schematic cross-sectional view showing a second modified example of the film capacitor model for analysis that simulates the film capacitor according to Example 1.

In FIG. 18, the external electrode portion C had a thickness of 1 mm, the first pitch angle θ1 was 71°, and the first pitch height H1 was 0.5 mm (the ratio of the first pitch height H1 to the first electrode thickness T1 was 50%). In this case, the thermal stress on the point X1 was 5.7 MPa. The thermal stress on the point X2 opposite to the point X1 was also 5.7 MPa.

Based on the above, the thermal stress applied to the point X1 and the point X2 is presumed to depend on the first pitch angle θ1 and the ratio of the first pitch height H1 to the first electrode thickness T1.

REFERENCE SIGNS LIST 1, 2 film capacitor
10 capacitor element
20 laminate
20a first end surface of laminate
20b second end surface of laminate
21 first metallized film
22 second metallized film
31 first dielectric film
31a first main surface of first dielectric film
31b second main surface of first dielectric film
32 second dielectric film
32a third main surface of second dielectric film
32b fourth main surface of second dielectric film
41 first metal layer
42 second metal layer
51 first external electrode
52 second external electrode
61 first lead wire
62 second lead wire
70 exterior resin (exterior body)
71 filling resin (exterior body)
72 outer case (exterior body)
101 first film reel
102 second film reel
111 first reel shaft
112 second reel shaft
200 winding shaft H1 first pitch height
H2 second pitch height
T1 first electrode thickness
T2 second electrode thickness
θ1 first pitch angle
θ2 second pitch angle
The invention claimed is:

1. A film capacitor comprising:
a capacitor element that includes:
   a laminate having a first end surface and a second end surface opposite to each other in a width direction;
   a first external electrode connected to the first end surface of the laminate; and
   a second external electrode connected to the second end surface of the laminate,
   wherein the laminate includes:
      a first dielectric film having a first main surface and a second main surface opposite to each other in a thickness direction perpendicular to the width direction;
      a second dielectric film having a third main surface and a fourth main surface opposite to each other in the thickness direction;
      a first metal layer connected to the first external electrode; and
      a second metal layer connected to the second external electrode, wherein
      the second main surface of the first dielectric film is opposite to the third main surface of the second dielectric film in the thickness direction,
      the first dielectric film protrudes toward the first external electrode with respect to the second dielectric film,
      when a protruding length of the first dielectric film with respect to the second dielectric film in the width direction is defined as a first protruding width, the first protruding width is larger at an outer peripheral portion of the laminate in the thickness direction than at a central portion of the laminate in the thickness direction, and the first protruding width at the outer peripheral portion of the laminate increases toward an outermost periphery of the laminate in the thickness direction,
      the second dielectric film protrudes toward the second external electrode with respect to the first dielectric film, and
      when a protruding length of the second dielectric film with respect to the first dielectric film in the width direction is defined as a second protruding width, the second protruding width is larger at the outer peripheral portion of the laminate in the thickness direction than at the central portion of the laminate in the thickness direction, and the second protruding width at the outer peripheral portion of the laminate increases toward the outermost periphery of the laminate in the thickness direction.

2. The film capacitor according to claim 1, wherein when viewed in a cross section in the thickness direction and the width direction, an angle between a straight line passing through a point X1 and a point Y1 and a straight line passing through ends of layers of the first dielectric film at which the first protruding width is smallest is 50° to 80°, where the point X1 is an end of a first layer of the layers of the first dielectric film which is closest to an outermost periphery of the laminate in the thickness direction and at which the first protruding width is largest, and the point Y1 is an end of a second layer of the layers of the first dielectric film which is closest to the point X1 and at which the first protruding width is smallest.

3. The film capacitor according to claim 2, wherein when viewed in the cross section in the thickness direction and the width direction, a length between the point X1 and the point Y1 in the width direction is 5% to 50% of a length between an outer end of the first external electrode and the point X1 in the width direction.

4. The film capacitor according to claim 3, wherein when viewed in the cross section in the thickness direction and the width direction, an angle between a straight line passing through a point X2 and a point Y2 and a straight line passing through ends of layers of the second dielectric film at which the second protruding width is smallest is 50° to 80°, where the point X2 is an end of a third layer of the layers of the second dielectric film which is closest to the outermost periphery of the laminate in the thickness direction and at which the second protruding width is largest, and the point Y2 is an end of a fourth layer of the layers of the second dielectric film which is closest to the point X2 and at which the second protruding width is smallest.

5. The film capacitor according to claim 4, wherein when viewed in the cross section in the thickness direction and the width direction, a length between the point X2 and the point Y2 in the width direction is 5% to 50% of a length between an outer end of the second external electrode and the point X2 in the width direction.

6. The film capacitor according to claim 1, wherein when viewed in a cross section in the thickness direction and the width direction, a length between a point X1 and a point Y1 in the width direction is 5% to 50% of a length between an outer end of the first external electrode and the point X1 in the width direction, where the point X1 is an end of a first layer of layers of the first dielectric film which is closest to an outermost periphery of the laminate in the thickness direction and at which the first protruding width is largest, and the point Y1 is an end of a second layer of the layers of the first dielectric film which is closest to the point X1 and at which the first protruding width is smallest.

7. The film capacitor according to claim 1, wherein when viewed in a cross section in the thickness direction and the width direction, an angle between a straight line passing through a point X2 and a point Y2 and a straight line passing through ends of layers of the second dielectric film at which the second protruding width is smallest is 50° to 80°, where the point X2 is an end of a first layer of layers of the second dielectric film which is closest to an outermost periphery of the laminate in the thickness direction and at which the second protruding width is largest, and the point Y2 is an end of a second layer of the layers of the second dielectric film which is closest to the point X2 and at which the second protruding width is smallest.

8. The film capacitor according to claim 7, wherein when viewed in the cross section in the thickness direction and the width direction, a length between the point X2 and the point Y2 in the width direction is 5% to 50% of a length between an outer end of the second external electrode and the point X2 in the width direction.

9. The film capacitor according to claim 1, wherein when viewed in a cross section in the thickness direction and the width direction, a length between a point X2 and a point Y2 in the width direction is 5% to 50% of a length between an outer end of the second external electrode and the point X2 in the width direction, where the point X2 is an end of a first layer of layers of the second dielectric film which is closest to an outermost periphery of the laminate in the thickness direction and at which the second protruding width is largest, and the point Y2 is an end of a second layer of the layers of the second dielectric film which is closest to the point X2 and at which the second protruding width is smallest.

10. The film capacitor according to claim 1,
wherein the first metal layer is not connected to the second external electrode, and
the second metal layer is not connected to the first external electrode.

11. The film capacitor according to claim 1,
wherein the first metal layer is on the first main surface of the first dielectric film, and
the second metal layer is on the third main surface of the second dielectric film.

12. The film capacitor according to claim 1, wherein the first dielectric film and the second dielectric film each contain a curable resin as a main component thereof.

13. The film capacitor according to claim 1, wherein the first dielectric film and the second dielectric film each contain a thermoplastic resin as a main component.

14. The film capacitor according to claim 1, further comprising an exterior body covering an outer periphery of the capacitor element.

* * * * *